United States Patent
Petzen

(10) Patent No.: US 9,328,633 B2
(45) Date of Patent: May 3, 2016

(54) CONTROL OF STEAM TEMPERATURE IN COMBINED CYCLE POWER PLANT

(75) Inventor: John Petzen, Salem, VA (US)

(73) Assignee: General Electric Company, Schenectady, NY (US)

(*) Notice: Subject to any disclaimer, the term of this patent is extended or adjusted under 35 U.S.C. 154(b) by 956 days.

(21) Appl. No.: 13/487,730

(22) Filed: Jun. 4, 2012

(65) Prior Publication Data

US 2013/0318985 A1 Dec. 5, 2013

(51) Int. Cl.
*F01K 23/10* (2006.01)
*F02C 6/18* (2006.01)

(52) U.S. Cl.
CPC ............... *F01K 23/101* (2013.01); *F02C 6/18* (2013.01); *F05D 2270/303* (2013.01); *Y02E 20/16* (2013.01)

(58) Field of Classification Search
CPC ..... F01K 23/101; F02C 6/18; F05D 2270/00; F05D 2270/303; F22G 5/02; F22G 5/04; F22G 5/12
See application file for complete search history.

(56) References Cited

U.S. PATENT DOCUMENTS

| | | | |
|---|---|---|---|
| 3,202,136 A * | 8/1965 | Hottenstine | 122/448.4 |
| 3,766,732 A | 10/1973 | Woodcock | |
| 3,782,113 A | 1/1974 | Luongo | |
| 3,792,583 A | 2/1974 | Luongo et al. | |
| 3,875,384 A | 4/1975 | Davis | |
| 3,879,616 A | 4/1975 | Baker et al. | |
| 3,898,441 A | 8/1975 | Davis et al. | |
| 3,898,842 A | 8/1975 | Luongo | |
| 3,908,897 A | 9/1975 | van Holtz et al. | |
| 3,928,972 A | 12/1975 | Osborne | |
| 3,934,128 A | 1/1976 | Uram | |
| 3,937,934 A | 2/1976 | Pasemann | |
| 3,939,328 A | 2/1976 | Davis | |
| 3,955,358 A | 5/1976 | Martz et al. | |
| 3,959,635 A | 5/1976 | Tanco | |
| 3,965,675 A | 6/1976 | Martz et al. | |
| 3,973,391 A | 8/1976 | Reed et al. | |
| 3,974,643 A | 8/1976 | Smith et al. | |

(Continued)

FOREIGN PATENT DOCUMENTS

| | | |
|---|---|---|
| DE | 2853919 A1 | 6/1979 |
| EP | 0316806 A2 | 5/1989 |

(Continued)

OTHER PUBLICATIONS

Ganapathy, V., Understand Steam Generator Performance, Chemical Engineering Progress, Dec. 1994, pp. 42-47, ABCO Industries, Abilene, TX, USA.

(Continued)

*Primary Examiner* — Phutthiwat Wongwian
*Assistant Examiner* — Carlos A Rivera
(74) *Attorney, Agent, or Firm* — Sutherland Asbill & Brennal LLP

(57) ABSTRACT

A combined cycle power plant may include a gas turbine comprising a feed forward signal generator and configured to operate in one of one or more firing modes and generate exhaust gas and a heat recovery steam generator configured to receive the exhaust gas and extract thermal energy from the exhaust gas to generate steam. The feed forward signal generator may be configured to generate a feed forward signal that is used to control the temperature of the steam generated by the heat recovery steam generator.

14 Claims, 3 Drawing Sheets

(56) References Cited

U.S. PATENT DOCUMENTS

| | | |
|---|---|---|
| 3,974,644 A | 8/1976 | Martz et al. |
| 3,974,645 A | 8/1976 | Smith |
| 4,000,037 A | 12/1976 | Nusbaum et al. |
| 4,005,581 A | 2/1977 | Aanstad |
| 4,013,877 A | 3/1977 | Uram et al. |
| 4,025,765 A | 5/1977 | Giras et al. |
| 4,028,884 A | 6/1977 | Martz et al. |
| 4,029,951 A | 6/1977 | Berry et al. |
| 4,029,952 A | 6/1977 | Giras et al. |
| 4,031,372 A | 6/1977 | Davis |
| 4,031,404 A | 6/1977 | Martz et al. |
| 4,031,863 A | 6/1977 | Laubli |
| 4,037,088 A | 7/1977 | Davis et al. |
| 4,042,813 A | 8/1977 | Johnson |
| 4,047,005 A | 9/1977 | Heiser et al. |
| 4,053,747 A | 10/1977 | Davis |
| 4,057,715 A | 11/1977 | Jones et al. |
| 4,090,065 A | 5/1978 | Braytenbah et al. |
| 4,091,450 A | 5/1978 | Bloch et al. |
| 4,099,374 A | 7/1978 | Foster-Pegg |
| 4,120,159 A | 10/1978 | Matsumoto et al. |
| 4,121,424 A | 10/1978 | Sato et al. |
| 4,144,846 A * | 3/1979 | Miszak ............... 122/479.1 |
| 4,168,608 A | 9/1979 | Uram |
| 4,181,840 A | 1/1980 | Osborne |
| 4,184,324 A | 1/1980 | Kiscaden et al. |
| 4,195,231 A | 3/1980 | Reed et al. |
| 4,201,924 A | 5/1980 | Uram |
| 4,208,882 A | 6/1980 | Lopes et al. |
| 4,222,229 A | 9/1980 | Uram |
| 4,226,086 A | 10/1980 | Binstock et al. |
| 4,227,093 A | 10/1980 | Uram et al. |
| 4,228,359 A | 10/1980 | Matsumoto et al. |
| 4,241,701 A * | 12/1980 | Morse ..................... 122/460 |
| 4,246,491 A | 1/1981 | Waldron et al. |
| 4,267,458 A | 5/1981 | Uram et al. |
| 4,280,060 A | 7/1981 | Kure-Jensen et al. |
| 4,303,369 A | 12/1981 | Hisano et al. |
| 4,312,301 A | 1/1982 | Anson |
| 4,333,310 A | 6/1982 | Uram |
| 4,372,125 A | 2/1983 | Dickenson |
| 4,380,172 A | 4/1983 | Imam et al. |
| 4,410,950 A | 10/1983 | Toyoda et al. |
| 4,427,896 A | 1/1984 | Waldron |
| 4,445,180 A | 4/1984 | Davis et al. |
| 4,448,026 A | 5/1984 | Binstock et al. |
| 4,455,614 A | 6/1984 | Martz et al. |
| 4,455,836 A | 6/1984 | Binstock et al. |
| 4,507,914 A | 4/1985 | Rice |
| 4,549,503 A * | 10/1985 | Keyes et al. ........... 122/479.1 |
| 4,550,562 A | 11/1985 | Rice |
| 4,558,227 A | 12/1985 | Yanada et al. |
| 4,571,935 A | 2/1986 | Rice |
| 4,578,944 A | 4/1986 | Martens et al. |
| 4,589,255 A | 5/1986 | Martens et al. |
| 4,687,946 A | 8/1987 | Jones |
| 4,780,057 A | 10/1988 | Silvestri, Jr. |
| 4,791,889 A * | 12/1988 | Matsko et al. ......... 122/479.1 |
| 4,809,623 A | 3/1989 | Garcia-Mallol |
| 4,809,625 A | 3/1989 | Garcia-Mallol et al. |
| 4,819,435 A | 4/1989 | Silvestri, Jr. |
| 4,827,429 A | 5/1989 | Silvestri, Jr. |
| 4,887,431 A | 12/1989 | Peet |
| 4,888,953 A | 12/1989 | Fukayama et al. |
| 4,888,954 A | 12/1989 | Silvestri, Jr. |
| 4,891,948 A | 1/1990 | Kure-Jensen et al. |
| 5,044,152 A | 9/1991 | Hoizumi et al. |
| 5,136,848 A | 8/1992 | Silvestri, Jr. |
| 5,140,818 A | 8/1992 | Silvestri, Jr. et al. |
| 5,191,764 A | 3/1993 | Silvestri, Jr. |
| 5,333,457 A | 8/1994 | Silvestri, Jr. |
| 5,377,489 A | 1/1995 | Silvestri, Jr. et al. |
| 5,412,937 A | 5/1995 | Tomlinson et al. |
| 5,428,950 A | 7/1995 | Tomlinson et al. |
| 5,517,424 A | 5/1996 | Marcelle et al. |
| 5,577,377 A | 11/1996 | Tomlinson |
| 5,628,179 A | 5/1997 | Tomlinson |
| 5,791,147 A | 8/1998 | Earley et al. |
| 5,794,446 A | 8/1998 | Earley et al. |
| 5,850,740 A | 12/1998 | Sato et al. |
| RE36,497 E | 1/2000 | Tomlinson |
| RE36,524 E | 1/2000 | Tomlinson |
| 6,032,468 A | 3/2000 | Fetescu et al. |
| 6,044,804 A | 4/2000 | Franke et al. |
| 6,128,895 A | 10/2000 | Takahama et al. |
| 6,230,480 B1 | 5/2001 | Rollins, III |
| 6,279,308 B1 | 8/2001 | Sonoda et al. |
| 6,324,829 B1 | 12/2001 | Kita et al. |
| 6,339,926 B1 | 1/2002 | Ichiro et al. |
| 6,422,022 B2 | 7/2002 | Gorman et al. |
| 6,494,045 B2 | 12/2002 | Rollins, III |
| 6,606,848 B1 | 8/2003 | Rollins, III |
| 6,609,483 B1 | 8/2003 | Albrecht et al. |
| 6,715,505 B2 | 4/2004 | Higuchi |
| 6,792,759 B2 | 9/2004 | Rollins, III |
| 6,898,935 B2 | 5/2005 | Barber et al. |
| 6,957,541 B2 | 10/2005 | Hyakutake et al. |
| 7,003,939 B1 * | 2/2006 | Rackwitz et al. ............. 60/786 |
| 7,028,480 B2 | 4/2006 | Sekiai et al. |
| 7,131,259 B2 | 11/2006 | Rollins et al. |
| 7,328,587 B2 | 2/2008 | Shaffer et al. |
| 7,421,853 B2 | 9/2008 | Shaffer et al. |
| 7,421,854 B2 | 9/2008 | Shaffer et al. |
| 7,504,260 B1 | 3/2009 | Lang |
| 7,621,133 B2 | 11/2009 | Tomlinson et al. |
| 7,640,748 B2 | 1/2010 | Barber et al. |
| 7,668,623 B2 | 2/2010 | Kephart et al. |
| 7,922,155 B2 | 4/2011 | Havlena |
| 7,931,041 B2 | 4/2011 | Mehendale et al. |
| 7,966,977 B2 | 6/2011 | Schu |
| 2001/0023576 A1 | 9/2001 | Rollins, III |
| 2002/0002819 A1 | 1/2002 | Gorman et al. |
| 2003/0065436 A1 | 4/2003 | Hyakutake et al. |
| 2003/0131601 A1 | 7/2003 | Baxter |
| 2003/0150215 A1 | 8/2003 | Rollins, III |
| 2004/0011053 A1 * | 1/2004 | Murakami et al. ............. 60/773 |
| 2004/0031256 A1 | 2/2004 | Rollins, III |
| 2005/0016175 A1 | 1/2005 | Barber et al. |
| 2005/0150230 A1 | 7/2005 | Rollins, III |
| 2005/0160748 A1 | 7/2005 | Shaffer et al. |
| 2005/0160749 A1 | 7/2005 | Shaffer et al. |
| 2005/0160750 A1 | 7/2005 | Shaffer et al. |
| 2005/0204740 A1 | 9/2005 | Barber et al. |
| 2005/0274113 A1 | 12/2005 | Sekiai et al. |
| 2007/0113562 A1 | 5/2007 | Tomlinson et al. |
| 2007/0203862 A1 | 8/2007 | Sekiai et al. |
| 2007/0204623 A1 | 9/2007 | Rollins, III |
| 2007/0271938 A1 | 11/2007 | Shaffer |
| 2008/0029261 A1 | 2/2008 | Kephart et al. |
| 2008/0251952 A1 | 10/2008 | Havlena |
| 2008/0302102 A1 * | 12/2008 | Cheng et al. ................. 60/653 |
| 2009/0159018 A1 | 6/2009 | Mehendale et al. |
| 2010/0077946 A1 | 4/2010 | D'Agostini |
| 2010/0100248 A1 | 4/2010 | Minto et al. |
| 2010/0162930 A1 | 7/2010 | Okazaki et al. |
| 2010/0236241 A1 * | 9/2010 | Kumar et al. ................. 60/653 |
| 2011/0023487 A1 | 2/2011 | Olia |
| 2011/0056201 A1 | 3/2011 | Kluge et al. |
| 2011/0131995 A1 | 6/2011 | Havlena |

FOREIGN PATENT DOCUMENTS

| | | |
|---|---|---|
| EP | 0316806 A3 | 5/1989 |
| EP | 0316806 B | 5/1989 |
| EP | 0378713 B1 | 7/1990 |
| EP | 0928882 A1 | 7/1999 |
| EP | 0933505 A2 | 8/1999 |
| EP | 0942152 A1 | 9/1999 |
| EP | 0928882 A4 | 11/2001 |
| EP | 0942152 A4 | 11/2001 |
| EP | 0933505 A3 | 3/2002 |
| EP | 1293656 A2 | 3/2003 |
| EP | 1293656 A3 | 6/2003 |
| EP | 0928882 B1 | 8/2004 |

(56) References Cited

FOREIGN PATENT DOCUMENTS

| | | |
|---|---|---|
| EP | 1500792 A2 | 1/2005 |
| EP | 1752618 A2 | 2/2007 |
| EP | 1797284 B1 | 3/2008 |
| EP | 2221537 A1 | 8/2010 |
| FR | 2411969 A1 | 7/1979 |
| GB | 2010411 A | 6/1979 |
| GB | 2010411 B | 2/1982 |
| GB | 2166199 A | 4/1986 |
| GB | 2166199 B | 5/1988 |
| JP | 54095854 A | 7/1979 |
| JP | 61107004 A | 5/1986 |
| JP | 5296401 A | 11/1993 |
| JP | 6146814 A | 5/1994 |
| WO | 8101970 A1 | 7/1981 |
| WO | 0012871 A2 | 3/2000 |
| WO | 2005071231 A2 | 8/2005 |
| WO | 2008127977 A2 | 10/2008 |
| WO | 2010036852 A2 | 4/2010 |

OTHER PUBLICATIONS

Anonymous, Powerful Tool Integrates Technical and Financial Decision Making, SOAPP-CT Version 8.0 Released, Press Release, Feb. 13, 2007, EPRI, Palo Alto, CA USA.

Anonymous, CCI DRAG DA-90DSV Attemperator, Company Brochure, pp. 1-7.

* cited by examiner

CONTROL OF STEAM TEMPERATURE IN COMBINED CYCLE POWER PLANT

FIELD OF THE DISCLOSURE

This disclosure generally relates to steam temperature control, and in particular, to steam temperature control in combined cycle power plants.

BACKGROUND OF THE DISCLOSURE

Combined cycle power plants generally include a gas turbine driven by combusting fuel, such as natural gas, and a heat recovery steam generator that produces steam from the exhaust of the gas turbine to power a steam turbine. Therefore, some of the heat generated during the operation of the gas turbine may be captured by the heat recovery steam generator to produce steam that can be used for further generation of electrical power. More particularly, the heat from the operation of the gas turbine may be captured from the exhaust of the gas turbine. The gas turbine may be operated in one of several different firing modes, or dry low NOx (DLN) mode, where each firing mode may correspond to a varying number of combustors, or cans, of the gas turbine that are operated. The quantity of fuel and/or the fuel air mix that is combusted in the gas turbine may vary for each of the firing modes. If the operation of the gas turbine is changed from one firing mode to another firing mode, the temperature of the exhaust may also change.

To enable efficient operation of the steam turbine, and therefore the combined cycle power plant, the steam temperature may be controlled within a predetermined range. Manufacturers of power plants may provide a specification related to the level of control of the steam that is achievable by the combined cycle power plant. In some cases, the manufacturers of combined cycle power plants may be required to demonstrate the control of steam temperature with the predetermined range. The steam temperature may be controlled by a variety of mechanisms, including attemperation by spraying water into a counter flowing heat exchanger of the heat recovery steam generator. The amount of water that is provided may be modulated to control the temperature of the steam.

In certain cases, it may be difficult to control the temperature within a predetermined band, such as a band of 10° Fahrenheit (F). For example, it may be particularly difficult to control the temperature of the steam generated by the heat recovery steam generator when the gas turbine changes firing modes. The discontinuity in the output temperature of the exhaust gases from the gas turbine as a result of the change in firing mode may be difficult to compensate for using water spray attemperation within the heat recovery steam generator. Therefore, changes in the firing mode of the gas turbine may result in temperature excursions outside of allowable limits of temperature of the steam generated by the heat recovery steam generator.

BRIEF SUMMARY OF THE DISCLOSURE

Certain embodiments of the disclosure may provide a feed forward control signal to an attemperator controller to control the attemperation of steam generated by a heat recovery steam generator. Therefore, the feed forward control signal may control the parameters of a water spray, such as the flow of water, provided by the attemperator controller to a counter flow heat exchanger of the heat recovery steam generator. The feed forward signal may be indicative of a change in steam temperature as a result of a change in the firing mode of the gas turbine. The feed forward signal may, therefore, be the inverse of changes in the temperature of the steam temperature. The feed forward signal may be provided to the attemperator controller to perturb or modify the control of the spray of water to the heat recovery steam generator. In one aspect, the feed forward signal may be generated using at least one signal corresponding to one of a plurality of firing modes of the gas turbine and may be indicative of the change of steam temperature.

In certain embodiments, an apparatus may include at least one timer, where each timer corresponds with a respective firing mode of a gas turbine and is configured to generate a timing signal when the corresponding respective firing mode is active. The apparatus may further include at least one interpolation block, each interpolation block corresponding to each of the at least one timers and configured to generate an output signal when the corresponding respective firing mode is active and a summation block receiving the output signal of each of the interpolation blocks and configured to generate a feed forward control signal.

In other embodiments, a method may include providing at least one signal associated with one or more firing modes of a gas turbine, determining based at least in part on the at least one signal which firing mode is active, generating a feed forward signal based at least in part on the at least one signal corresponding to the active firing mode, and providing the feed forward signal to an attemperator controller.

In yet other embodiments, a combined cycle power plant may include a gas turbine comprising a feed forward signal generator and configured to operate in one of one or more firing modes and generate exhaust gas and a heat recovery steam generator configured to receive the exhaust gas and extract thermal energy from the exhaust gas to generate steam. The feed forward signal generator may be configured to generate a feed forward signal that is used to control the temperature of the steam generated by the heat recovery steam generator.

Other embodiments, features, and aspects of the disclosure are described in detail herein and are considered a part of the claimed invention Other embodiments, features, and aspects can be understood with reference to the following detailed description, accompanying drawings, and claims.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE DISCLOSURE

Embodiments of the disclosure are described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Embodiments of the disclosure may provide apparatus, systems, and methods for controlling spray attemperation of a heat recovery steam generator, or boiler, of a combined cycle power plant. A feed forward signal for the control of a spray attemperator associated with the heat recovery steam generator may be determined by a feed forward signal generator associated with the gas turbine. Therefore, the control of the attemperation of the heat recovery steam generator may be controlled using signals generated at the gas turbine. Furthermore, the feed forward signal may be based upon the firing mode of the gas turbine. As the firing mode, or the dry low NOx (DLN) mode, of the gas turbine changes, the temperature of the exhaust of the gas turbine may also change. In some cases, the change in the exhaust temperature may be relatively discontinuous. The feed forward signal may be indicative of the discontinuous nature of the exhaust temperature of the gas turbine. Therefore, the feed forward signal may be used by the attemperation controller associated with the heat recovery steam generator.

While described herein in the context of a combined cycle power plant, it will be appreciated that the systems, apparatus, and methods, disclosed herein for the control of downstream steam temperature may be used for any suitable steam temperature control application.

Example embodiments of the disclosure will now be described with reference to the accompanying figures.

Figure 1:
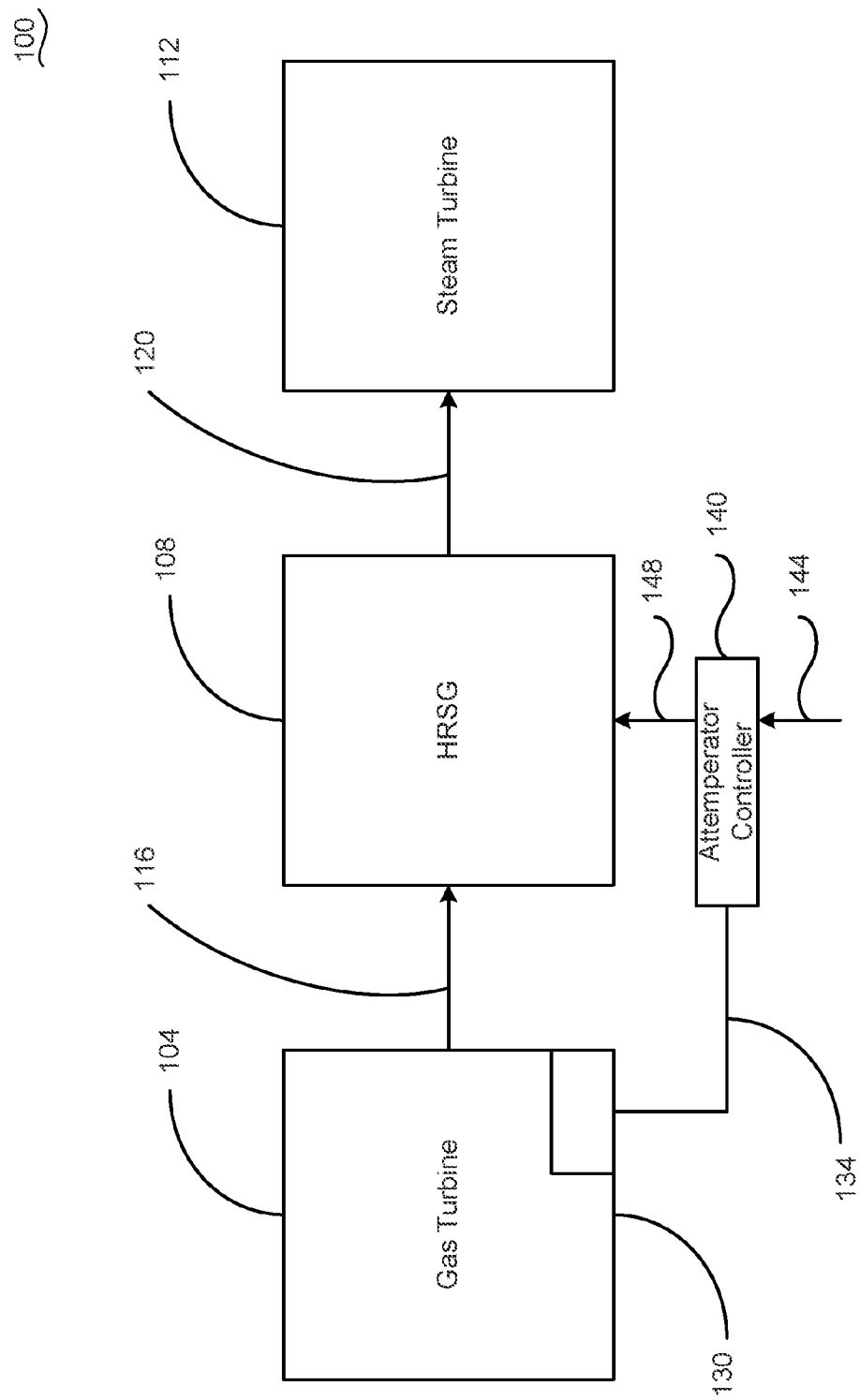
FIG. 1 is a simplified block diagram illustrating a combined cycle power plant that may be operated according to embodiments of the disclosure.

Referring now to FIG. 1, a simplified block diagram of a combined cycle power plant 100 that may be operated in accordance with embodiments of the disclosure is described. The combined cycle power plant may include a gas turbine 104, a heat recovery steam generator 108, and a steam turbine 112. The gas turbine 104 may be configured to drive one or more generators (not shown) to generate electrical power. Likewise, the steam turbine 112 may also be configured to drive one or more generators (not shown) to generate electrical power.

During operation, the gas turbine 104 may receive fuel, such as natural gas, and an oxidizer, such as air, and mix the fuel and air to a predetermined ratio. The mechanisms for mixing the fuel and air are well known and, in the interest of brevity, will not be discussed herein. The fuel air mixture may be burned within the gas turbine 104 to provide power to spin the gas turbine 104. The combusted products in the gas turbine 104 may traverse multiple regions of the gas turbine 104, such as high pressure, medium pressure, and/or low pressure regions before exhausting from the gas turbine 104 as gas turbine exhaust 116. Additionally, there may be multiple burners, or combustor cans, that can be lit to combust the fuel air mixture within the gas turbine 104. Different combinations of combustor cans may be lit, corresponding to different firing modes of the gas turbine 104. The firing mode may be changed during the operation of the gas turbine 104 for a variety of reasons, including, for example, a change in the demand for electrical power. Indeed, how much fuel is combusted in the gas turbine may vary with the firing mode in which the gas turbine 104 is operated. Furthermore, the quantity and temperature of the gas turbine exhaust 116 may vary with the firing mode in which the gas turbine 104 operates. Therefore, if the firing mode under which the gas turbine 104 operates is changed, then the quantity and/or temperature of gas turbine exhaust may also change and, furthermore, may change in a relatively discontinuous manner.

While the combustion of the fuel air mixture and the resulting volumetric expansion during combustion powers the gas turbine 104, there may still be thermal energy present in the gas turbine exhaust 116 that may be captured for further electrical power production. Therefore, the gas turbine exhaust 116 may be provided to the heat recovery steam generator 108 where the heat recovery steam generator 108 may generate steam, such as dry steam, by using the thermal energy of the gas turbine exhaust 116. There may be a thermal lag between the generation of the gas turbine exhaust 116 at the gas turbine 104 and the arrival of that gas turbine exhaust 116 at the heat recovery steam generator 108. In some cases, the thermal lag may be in the range of approximately 2 seconds to approximately 5 seconds. As a result, relatively discontinuous changes in the temperature of the gas turbine exhaust 116 may be observed at the heat recovery steam generator 108 with the thermal lag, or otherwise after the thermal lag time has elapsed.

The gas turbine exhaust 116 may, therefore, be provided to the heat recovery steam generator 108 to extract heat therefrom by producing steam 120 that is further provided to the steam turbine 112. In other words, the energy released by the combustion of the fuel in the gas turbine 104 may be used to drive both a Brayton cycle and a Rankine cycle to extract mechanical energy therefrom. The heat recovery steam generator 108 may include one or more counter flowing heat exchangers with one or more superheaters to extract thermal energy from the gas turbine exhaust 116 in an efficient manner. In certain embodiments, the steam 120 may be provided to the steam turbine 112 at various pressures, such as low-pressure steam, intermediate pressure steam, and high-pressure steam. Each of the various pressures of steam may have one or more superheaters associated therewith in the heat recovery steam generator 108. Various pressures of steam 120 may be provided to the steam turbine 112 to operate different regions of the steam turbine 112. For example, the steam turbine 112 may include low pressure, intermediate pressure, and high-pressure blades connected to a common shaft of the steam turbine 112. In one aspect, a relatively well-controlled steam 120 temperature may result in a relatively more efficient operation of the steam turbine 112. As a non-limiting example, operating the steam turbine 112 with a steam temperature of 1050° F.+/−10° F. may result in a relatively high level of steam turbine 112 efficiency. Therefore, to achieve a relatively high level of power efficiency from the combined cycle power plant, the steam temperature may be controlled within a predetermined range, such as the 10° F. range of the aforementioned non-limiting example.

The temperature of the steam 120 generated by the heat recovery steam generator 108 may be controlled by any suitable process, including attemperation by spraying water into the counter flowing heat exchanger of the heat recovery steam generator 108. Attemperation spray 148 may be provided at or between one or more superheaters of the heat recovery steam generator 108. As a non-limiting example, the attemperation spray 148 may be provided between a first stage superheater and a finishing superheater within the heat recovery steam generator 108. The attemperation may be controlled using a control loop based on metrics and/or signals associated with the temperature of the steam 120 generated by the heat recovery steam generator 108. In some cases, the metrics and/or signals associated with the steam 120 may be collected using sensors, such as thermocouples. The control of the attemperation spray 148 may further include the use of signals that are predictive of the discontinuities expected in the temperature of the steam 120 due to a change in the firing mode of the steam turbine 104. It will be appreciated, therefore, that signals provided by and/or collected at the gas turbine 104 may be fed forward to control the temperature, such as by the attemperation spray 148, of the steam 120 generated by the heat recovery steam generator 108. Indeed, the attemperation spray 148 and the resulting control of the steam 120 temperature may be controlled by both a control loop based on the steam 120 temperature and a perturbation to that control loop based on an expected discontinuity resulting from a change in the firing mode of the gas turbine 104.

The gas turbine 104 may include a feed forward signal generator 130 that may generate a feed forward signal 134 based at least in part on inputs and signals indicative of particular firing modes of the gas turbine 104. In other words, the feed forward signal generator 130 may determine, based upon one or more signals received by the feed forward signal generator 130, which of a plurality of firing modes is active. In this case, the active mode may have a corresponding respective signal which can indicate if that mode is active. When that particular mode is active, the feed forward signal 134 may be generated based at least in part on stored information associated with the change in the temperature of the steam in that particular active firing mode. Therefore, the feed forward signal generator 130 may have stored thereon data associated with expected changes in the steam temperature from the heat recovery steam generator 108 due to changes in the firing mode of the steam generator 104. The data associated with the discontinuities in the steam temperature resulting from changes in the firing mode may be determined for all permutations of firing mode changes during installation and/or set-up of the combined cycle power plant 100. The data may further be stored in one or more memories associated with the feed forward signal generator 130.

This feed forward signal 134 may be provided to an attemperator controller 140 that may receive water 144 and provide the water as the attemperation spray 148 to the heat recovery steam generator 108. The attemperation spray 148 may be controlled, at least in part, based upon the feed forward signal 134. The attemperation spray 148 may be controlled by controlling one or more water valves of the attemperator controller 140. For example, the attemperation spray 148 may be controlled by controlling the apertures of the one or more water valves. The attemperation spray 148, as controlled by the attemperator controller 140, based at least in part upon the feed forward signal 134, may control the steam 120 generated by the heat recovery steam generator 108 within a predetermined range, such as, for example, 1050° F.+/−10° F. Therefore, in one aspect, the feed forward signal 134 may be determined at the gas turbine 104 and fed forward to the heat recovery steam generator 108. In another aspect, the feed forward signal 134, as generated by the feed forward signal generator 130, may be used by the attemperator controller 140 to control one or more water valves and the flow of water therethrough, to control the attemperator spray 148. In yet another aspect, the feed forward signal 134 may be based upon the firing mode of the gas turbine 104 and the gas turbine exhaust 116 temperature.

Figure 2:
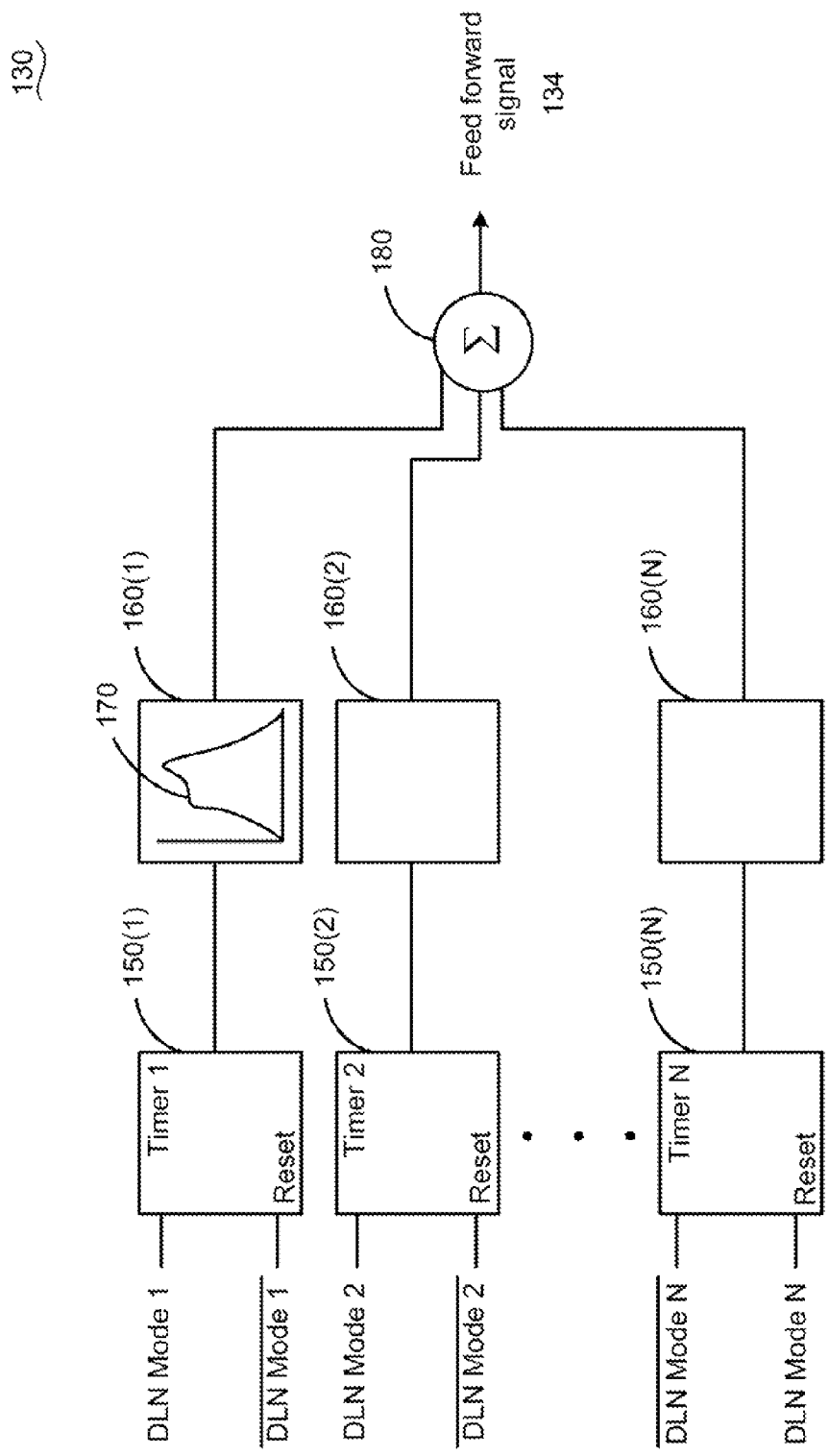
FIG. 2 is a simplified block diagram illustrating an example feed forward signal generator to provide a feed forward signal to control the temperature of steam in the combined cycle power plant of FIG. 1 according to embodiments of the disclosure.

Referring now to FIG. 2, a block diagram of an example feed forward signal generator 130 in accordance with embodiments of the disclosure is described. The feed forward signal generator 130 may include one or more timers 150(1), 150(2), and 150(N), where each timer corresponds to a respective firing mode of the gas turbine 104. In other words, each unique combination of lit combustors in the gas turbine 104 may correspond to a unique firing mode of the gas turbine 104 and, therefore, each unique set of lit combustors may correspond to a respective timer (referred to collectively as 150). In certain embodiments, the timers 150 may be count-up timers with one or more count registers that increment with time. In certain aspects, the count-up timers 150 may count up to 10 seconds or more. The count-up timers 150 may have a "RESET" input, and may have an appropriate signal supplied to the RESET input that may effectuate a resetting of the timer 150. The feed forward signal generator 130 may further include interpolation blocks 160(1), 160(2), and 160(N) corresponding to respective timers 150(1), 150(2), and 150(N) and, therefore, corresponding to respective firing modes of the gas turbine 104. The interpolation blocks (referred to collectively as 160) may be configured to generate an output signal 170 associated with the change in steam 120 temperature if the corresponding respective timer 150 is active and provide a timer signal to the interpolation block 160. The feed forward signal generator 130 may further include a summation block 180 that is configured to receive the output signal 170 from each of the interpolation blocks 160 and sum the output signals 170 to generate the feed forward signal 134 for controlling the attemperation of the heat recovery steam generator 108.

In operation, the timers 150 may receive one or more signals corresponding to the respective firing mode (DLN_MODE_X) of the gas turbine 104. The signals provided to the timers 150 may be provided by the gas turbine 104 and may be indicative of the firing mode under which the gas turbine 104 is operating. In this example embodiment, the timer 150 may receive both a DLN mode, or firing mode signal, as well as the Boolean opposite of the same signal. In other embodiments, any appropriate transformation of the DLN mode signal, or firing mode signal, may be received by the timers 150. Based on the signals from the gas turbine 104 received by the timers 150, the timer 150 corresponding to the active firing mode may be activated and may, therefore, count up. In certain embodiments, only one of the timers 150 may be active at any point of time. When the particular timer 150 corresponding to the active firing mode counts up, the corresponding interpolation block 160 may be provided with the current elapsed time on the active timer 150. In other words, the active timer 150 may provide the current value of the count-up register to the corresponding respective interpolation block 160. At this point, the respective interpolation block 160 receiving the active timer 150 signal may provide an output signal 170. In this example embodiment, the first extrapolation block 160(1) is illustrated as receiving a timer signal from timer 150(1), but it will be appreciated that based on the active firing mode, any of the timers 150 may provide a timer signal to its corresponding interpolation block 160 and the corresponding interpolation block may provide the output signal 170.

The output signal 170 of the interpolation block 160 may be based, at least in part, on the temperature change of the steam 120 due to a respective change in the firing mode of the gas turbine 104. Therefore, in one aspect, during set-up of the combined cycle power plant 100, the interpolation blocks 160 may receive sensor data, such as from thermocouples that measure the temperature of the steam 120 from the heat recovery steam generator 108 corresponding to a transition in the firing mode of the gas turbine. The sensor data may further be used by the interpolation blocks to generate and store data related to the change in steam temperature as a result of changes in the firing modes of the gas turbine 104. Furthermore, the expected changes in the steam temperature, or the inverse thereof, due to changing to a particular firing mode may be stored on each of the respective interpolation blocks 160. In one aspect, the interpolation block 160 may have memory associated therewith that may provide an interpolation block output signal 170 related to the expected change in the steam 120 temperature due to the change to a particular firing mode. In certain embodiments, the interpolation block output signal 170 may be related to the inverse of the expected change in the steam temperature due to a particular change in the firing mode of the gas turbine 104. The resulting feed forward signal 134 may, in certain embodiments, be used directly to control the attemperation at the heat recovery steam generator 108. It will be appreciated that in certain other embodiments, the feed forward signal 134 may be directly related to the steam 120 temperature. The feed forward signal 134, once determined by the feed forward signal generator 130, may be provided to the attemperator controller 140 for the control of one or more water valves to control the attemperation spray 148. The feed forward signal 134 may arrive at the heat recovery steam generator 108 before the corresponding gas turbine exhaust 116 arrives at the heat recovery steam generator 108. In certain embodiments, the gas turbine exhaust 116 may arrive at the heat recovery steam generator 108 with a lag of approximately the thermal lag from the heat recovery steam generator 108 receiving the feed forward signal 134. In one aspect, the feed forward signal 134 may indicate discontinuities and/or excursions in the gas turbine exhaust 116 temperature, particularly when there is a change in the firing mode of the gas turbine 104. In another aspect, the feed forward signal 134, in addition to real-time sensor measurements of the steam 120 temperature may be used to control the attemperation spray 148 from the attemperator controller 140.

It will be evident that the feed forward signal 134 as supplied to the attemperation controller 140 to control the attemperation spray 148 may be generated based, at least in part, on one or more signals generated at the gas turbine 104. Therefore the feed forward signal 134 used to control the heat recovery steam generator 108 may be determined at and by the gas turbine 104.

It will be appreciated that the constituent elements 150, 160, 180 of the feed forward signal generator 130 may be implemented on one or more electronic devices, such as one or more processors, running one or more system and/or application software thereon. The feed forward signal generator 130 may also have one or more memories to store instructions thereon to provide to the one or more processors to operate the feed forward signal generator 130.

Figure 3:
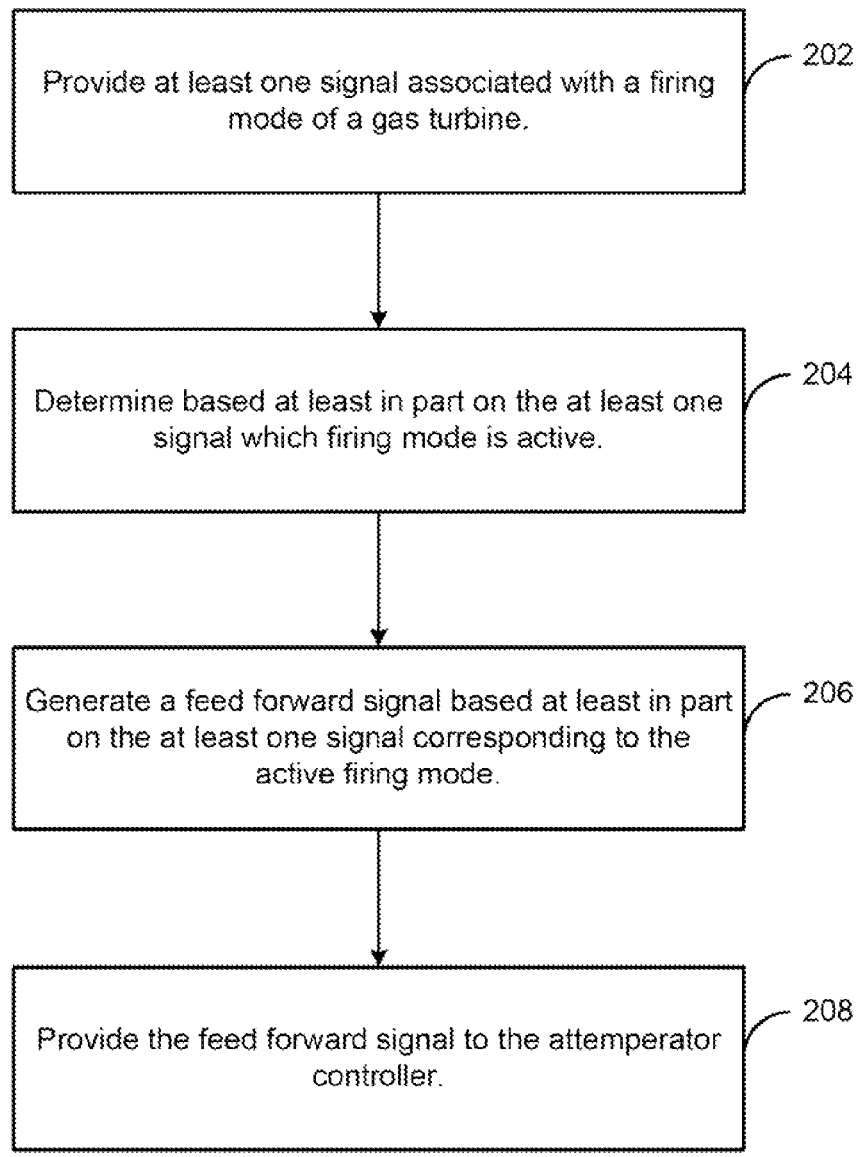
FIG. 3 is a flow diagram of an example method for operating the combined cycle power plant of FIG. 1 according to embodiments of the disclosure.

Referring now to FIG. 3, an example method 200 for providing a feed forward signal to an attemperator controller is discussed. The method 200 may be carried out by the combined cycle power plant 100 of FIG. 1, and more particularly the feed forward signal generator 130 of FIG. 2. At block 202, at least one signal associated with the firing mode of the gas turbine may be provided to the feed forward signal generator 130. As discussed in conjunction with FIG. 2, the associated at least one signal may be indicative of which of the firing modes of the gas turbine 104 are active at any particular point in time.

The at least one signal may be used, at least in part, to determine which of the firing modes of the gas turbine is active, at block 204. As discussed above, the at least one signal may be provided to a plurality of timers 150 and based on the at least one signal, only one of the plurality of the timers 150 may be active at any point in time. Indeed, the timer 150 corresponding to the active firing mode may be active and, therefore, the feed forward signal generator 130 may aware of which of the firing modes of the gas turbine 104 is active.

At block 206, a feed forward signal based, at least in part, on the at least one signal corresponding to the active firing mode may be generated. In one aspect, the feed forward signal 134 may be generated based upon the interpolation block input signal 170 as generated by the active interpolation block 160, as described in conjunction with FIG. 2. The feed forward signal 134 may be based on historical data or data stored in a database for that particular combined cycle power plant 100 indicative of the change of the steam temperature due to a change in the firing mode of the gas turbine 104. In one aspect, the active interpolation block 160 may generate the interpolation block signal based on providing a difference in the steam 120 temperature and a predetermined temperature level. This signal may be provided as a time series, with the elapsed time signal provided by the corresponding respective active timer 150. Therefore, the interpolation block signal may be a time series signal based on the output of the corresponding timer 150 and the expected temperature excursion of the steam 120. The feed forward signal 134 may be provided by the summation block 180, by summing all of the outputs of the interpolation blocks 160 and providing a single time series signal.

The feed forward signal may then be provided to the attemperator controller at block 208. The attemperator controller 140 may use the feed forward signal to provide attemperation spray 148 control to control the temperature of the steam 120 provided by the heat recovery steam generator 108 to the steam turbine 112.

It should be noted, that the method 200 may be modified in various ways in accordance with certain embodiments of the disclosure. For example, one or more operations of the method 200 may be eliminated or executed out of order in other embodiments of the disclosure. Additionally, other operations may be added to the method 200 in accordance with other embodiments of the disclosure.

While certain embodiments of the disclosure have been described in connection with what is presently considered to be the most practical and various embodiments, it is to be understood that the disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:
1. An apparatus, comprising:
   at least one timer, each timer corresponding with a respective firing mode of a gas turbine and configured to generate a timing signal when the corresponding respective firing mode is active;
   at least one interpolation block, each interpolation block corresponding to each of the at least one timer and configured to generate an output signal when the corresponding respective firing mode is active; and, a summation block receiving the output signal of each of the interpolation blocks and configured to generate a feed forward control signal that controls water injection rate of an attemperator.

2. The apparatus of claim 1, wherein the at least one timer are count-up timer.

3. The apparatus of claim 1, wherein the at least one timer is configured to reset when the corresponding respective firing mode is inactive.

4. The apparatus of claim 1, wherein the at least one interpolation block is configured to receive the timing signal from the corresponding respective timer.

5. The apparatus of claim 1, wherein generating an output signal further comprises receiving at least one signal associated with the active firing mode.

6. The apparatus of claim 1, wherein the output signal of each interpolation block is indicative of a change in steam temperature from a heat recovery steam generator when the corresponding respective firing mode is active.

7. The apparatus of claim 1, wherein the feed forward signal is an inverse of a change in a steam temperature from a heat recovery steam generator resulting from a change in a firing mode of the gas turbine.

8. The apparatus of claim 7, wherein the feed forward signal is provided to an attemperator controller.

9. A combined cycle power plant, comprising:
a gas turbine configured to operate in one of one or more firing modes and generate exhaust gas that is used for generating steam, the gas turbine including a feed forward signal generator configured to generate at least one feed forward signal that is predictive of an expected steam temperature discontinuity due to a change in a firing mode of the gas turbine, the expected steam temperature discontinuity defined at least in part on the basis of stored data from permutations of firing mode changes, wherein the feed forward signal generator comprises one or more timers, each timer corresponding to a set of lit combustors in the gas turbine; and
a heat recovery steam generator configured to receive the exhaust gas and extract thermal energy from the exhaust gas to generate steam, the heat recovery steam generator further configured to use the feed forward signal that is used to control the temperature of the steam generated by the heat recovery steam generator.

10. The combined cycle power plant of claim 9, wherein the feed forward signal generator comprises:
each timer corresponding with one of the one or more firing modes of the gas turbine and configured to generate a timing signal when the corresponding respective firing mode is active;
at least one interpolation block, each interpolation block corresponding to each of the at least one timers and configured to generate an output signal when the corresponding respective firing mode is active; and
a summation block receiving the output signal of each of the interpolation blocks and configured to generate the at least one feed forward control signal.

11. The combined cycle power plant of claim 9, wherein controlling the attemperation of the heat recovery steam generator comprises spraying water into a counter flowing heat exchanger.

12. The combined cycle power plant of claim 9, wherein the feed forward signal is an inverse of a change in a steam temperature from a heat recovery steam generator resulting from a change in the one or more firing modes of the gas turbine.

13. The combined cycle power plant of claim 9, wherein the at least one feed forward signal is configured to be sensed at the heat recovery steam generator before a gas turbine exhaust corresponding to the expected steam temperature discontinuity arrives at the heat recovery steam generator.

14. The combined cycle power plant of claim 9, wherein the at least one feed forward signal is configured to arrive at the heat recovery steam generator before a gas turbine exhaust, the gas turbine exhaust arriving at the heat recovery steam generator with a time lag corresponding to a thermal lag in the heat recovery steam generator.

* * * * *